US 9,858,671 B2

(12) United States Patent
Chen et al.

(10) Patent No.: US 9,858,671 B2
(45) Date of Patent: Jan. 2, 2018

(54) MEASURING APPARATUS FOR THREE-DIMENSIONAL PROFILOMETRY AND METHOD THEREOF

(71) Applicant: National Taiwan University, Taipei (TW)

(72) Inventors: Liang-Chia Chen, Taipei (TW); Chung-An Hsieh, Taipei (TW); Ming-Xuan Weng, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 559 days.

(21) Appl. No.: 14/483,821

(22) Filed: Sep. 11, 2014

(65) Prior Publication Data
US 2015/0070472 A1 Mar. 12, 2015

(30) Foreign Application Priority Data
Sep. 11, 2013 (TW) .............................. 102132815 A

(51) Int. Cl.
*G01B 11/25* (2006.01)
*G06T 7/00* (2017.01)
(Continued)

(52) U.S. Cl.
CPC ........ *G06T 7/0057* (2013.01); *G01B 11/2531* (2013.01); *G06T 7/521* (2017.01); *H04N 13/0253* (2013.01)

(58) Field of Classification Search
CPC .................................................. G06T 7/0057
See application file for complete search history.

(56) References Cited

U.S. PATENT DOCUMENTS 5,463,462 A 10/1995 Ohnishi et al.
6,055,056 A * 4/2000 Kuehmstedt ....... G01B 11/2504
356/243.4
(Continued)

FOREIGN PATENT DOCUMENTS

TW I309294 5/2009
TW I351574 11/2011

OTHER PUBLICATIONS

Basanta Bhaduri, C.J. Tay, C. Quan, H. Niu, Mikael Sjodahl, "Two wavelength simultaneous DSPI and DSP for 3D displacement field measurements", Feb. 3, 2011, Optics Communications 284.
(Continued)

*Primary Examiner* — Christopher S Kelley
*Assistant Examiner* — Asmamaw G Tarko
(74) *Attorney, Agent, or Firm* — WPAT, PC

(57) ABSTRACT

The present invention provides measuring apparatus and method for three-dimensional profilometry of an object, wherein a random-speckle beam and a structured fringe beam are projected onto the object and reflected therefrom for forming deformed random-speckle beam and structured fringe beams that are separately acquired by an image acquiring device thereby obtaining a random-speckle image utilized to determine an absolute phase information of each position on the surface of the object, and a structured fringe image utilized to determine a relative phase information for each position of the surface of the object. Each absolute phase information and each relative phase information corresponding to each position are converted into an absolute depth and a relative depth, respectively. Finally, the depth information of each position on the surface of the object is calculated by combining the corresponding absolute depth and the relative depth whereby the surface profile of the object can be established.

18 Claims, 14 Drawing Sheets

(51) Int. Cl.
  *H04N 13/02* (2006.01)
  *H04N 9/31* (2006.01)
  *G06T 7/521* (2017.01)

(56) References Cited

U.S. PATENT DOCUMENTS

| | | | |
|---|---|---|---|
| 6,639,685 B1* | 10/2003 | Gu | G06T 7/521 356/603 |
| 6,690,474 B1* | 2/2004 | Shirley | G01B 11/2527 356/512 |
| 7,661,828 B2 | 2/2010 | Allen et al. | |
| 2006/0114477 A1* | 6/2006 | Cox | G01B 11/25 356/602 |
| 2013/0324830 A1* | 12/2013 | Bernal | H04N 7/181 600/407 |
| 2014/0233848 A1* | 8/2014 | Han | G06K 9/00375 382/154 |
| 2014/0354681 A1* | 12/2014 | Xiong | G06T 7/00 345/619 |
| 2015/0136949 A1* | 5/2015 | De Nooij | G02B 21/0016 250/208.1 |

OTHER PUBLICATIONS

Jindong Tian and Xiang Peng, "Three-dimensional vision from a multisensing mechanism", May 1, 2006, vol. 45, No. 13, Applied Optics.

* cited by examiner

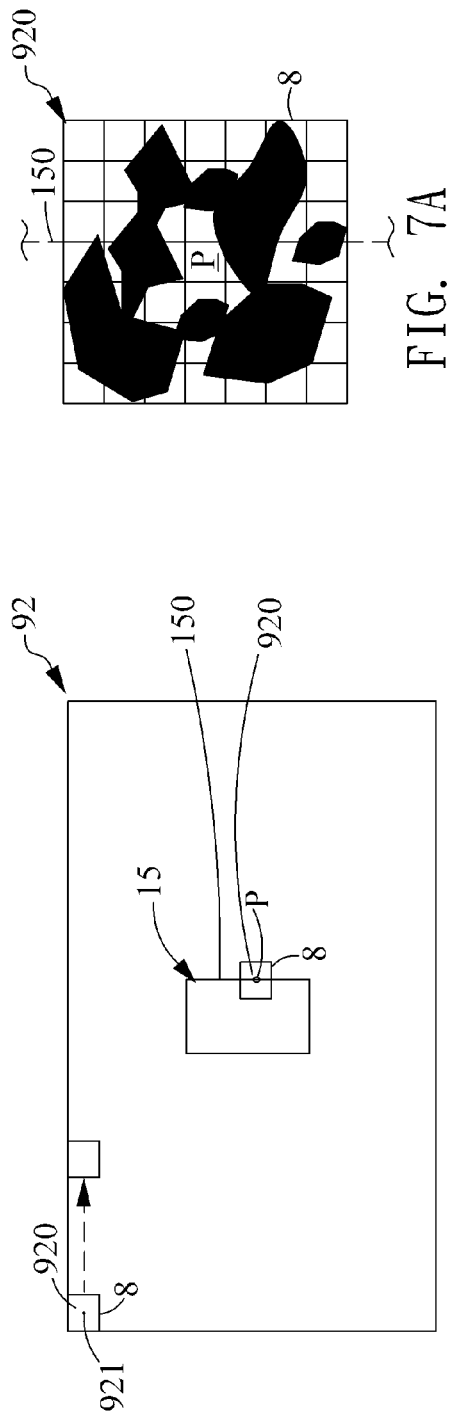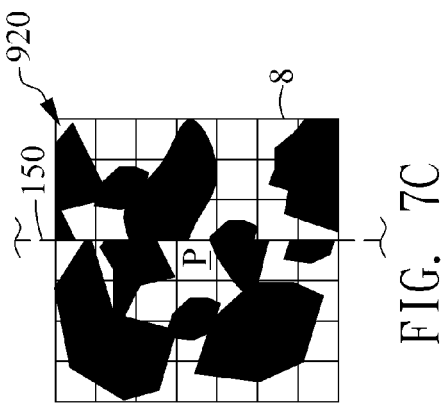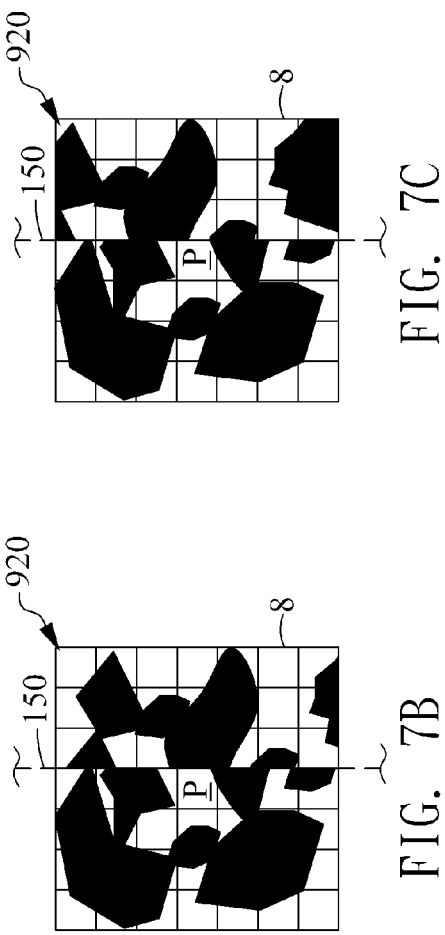

MEASURING APPARATUS FOR THREE-DIMENSIONAL PROFILOMETRY AND METHOD THEREOF

FIELD OF THE INVENTION

The present invention provides a three-dimensional profilometry and more particularly, a method and apparatus for three-dimensional profilometry, wherein an absolute phase information and a relative phase information obtained by analyzing a random-speckle image and a structured fringe image corresponding to a surface of an object are utilized to determine depths of inspection positions on the surface of the object such that a full-field surface profilometry with highly superior accuracy and a larger measurable range of the object's surface depth can be achieved.

BACKGROUND OF THE INVENTION

Three-dimensional profilometry is a common surface profile measuring technology for analyzing the quality of various manufacturing or other kind of processes in the modern time. Generally, the commonly used three-dimensional structured light projection profilometry includes phase-shifting, gray-code, binary-code and random-speckle projecting techniques.

In the phase-shifting profilometry, a multiple phase-shifting such as three-step phase-shifting interferometry is utilized for measuring the object surface by projecting sinusoidal fringe patterns having a series of shifting phases onto the object underlying test, acquiring the object light reflected from the surface of tested object for forming a deformed image, and determining surface high information by analyzing the deformed image through the phase retrieval algorithm. However, in the phase-shifting profilometry, since it is necessary to acquire a plurality of interference images for analyzing the surface profile of the object, it needs time-resolved multiple shifting operation to determine the tested surface of the object, its inspection efficiency is generally not desirable as other one-shot types of surface profiling methods, such as Fourier transform profilometry (FTP), which can only reply on single deformed structured pattern acquisition to complete the phase retrieval.

In the phase shifting profilometry (PSP), as well understood by those skilled in the art, PSP is normally rather precise in surface depth analysis when the tested surface profile varies by incremental steps less than ¼ of the projected period of the structured fringe located on its reference plane between any two adjacent pixels. However, when any surface discontinuity between two adjacent tested pixels is over the above limit exists, the well-known $2\pi$ phase ambiguities will be then encountered by PSP to obtain correct profiling result.

Regarding the gray code profilometry, conventionally, it is combined with phase-shifting profilometry (PSP) by projecting structured lights having structural patterns (or fringes) with various gray scale light intensity distribution onto the tested object and acquiring the reflected structured light for forming an object image wherein each pixel on the acquired object image has unique gray scale coding pattern relationship with its neighboring tested pixels. Although the gray scale coding combined with phase-shifting technique can be utilized to detect surface profile without being affected by the above mentioned phase ambiguity, when it comes to increase the depth resolution of surface profile analysis, a series o of multiple structural grey-code patterns with different gray scale variance should be projected onto the surface of object such that the decoding process on the acquired images is normally time-consuming and not competent with one shot measurement.

In the random speckle profilometry using digital imaging correlation (DIC) principle, a structured light having random speckle patterns is projected onto an object underlying test, and a deformed image with respect to the surface of the object is acquired to determine the surface profile of the tested object, wherein a plurality of image blocks having unique deformed (or spatially shifting) random speckle patterns with respect to the surface area of the object are acquired to mathematically correlate with a plurality of image samples stored in a database, which is established through a depth calibration procedure to record various corresponding patterns according to the calibrated depth, thereby obtaining an absolute phase information with respect to the surface depth of the tested object. Since, in the random speckle profilometry, it is often to use small lens apertures to obtain a high depth of field (DOF) measurement so as to acquire the absolute phase information with respect to the object surface. However the depth resolution and accuracy is reduced accordingly due to its large depth measuring range.

To solve the above mentioned problems encountered by the foregoing surface profilometry methods, conventionally, a structured light synthesized by two different periods of projected fringe patterns is utilized to increase the projecting fringe period, so called the equivalent fringe period, which is normally larger than two individual fringe periods. However, the effectiveness is not significant since the vertical measuring resolution is trade off with the measurable step height size. For example, in the technical disclosure "Three-dimensional vision from a multisensing mechanism, Jindong Tian and Xiang Peng, 1 May 2006/Vol. 45, No. 13/APPLICED OPTICS", a combination including a point-array encoding based on affine transformation and fringe encoding based on phase mapping is utilized to detect three-dimensional object surface having arbitrary geometric shapes, wherein the point-array encoding is initially applied to determine the fringe orders to create a control vertex mesh with absolute coordinate values in 3D space while the phase evaluation and phase unwrapping for fringe decoding is performed under the guidance of control vertex mesh. Since Tian disclosed two specific structured lights belonging to non-random structured light, the phase ambiguity may still be encountered when large surface discontinuity exists on the surface of the tested object. This is simply because the detected depth information is not based on the absolute phase basis.

Accordingly, there still is key need to provide a measuring apparatus and method for three-dimensional profilometry of an object for improving the above mentioned disadvantages of the conventional measuring technologies for surface profilometry.

SUMMARY OF THE INVENTION

The present invention provides a method and apparatus of three-dimensional profilometry, which synchronously or asynchronously projects a first structured light having randomly distributed pattern such as speckle patterns and being formed by a first light wavelength, and a second structured light such as sinusoidal structured light having structured fringe patterns and being formed by a second light wavelength onto an object underlying test, acquires the deformed structured light reflected from the object by an image acquiring module thereby forming a random-speckle image and a structured-fringe one having scope of field the same as each other, which are detected by two individual photo sensing devices with their corresponding wavelength-dependent light filters setting in advance of the imaging devices, and, finally, determines the surface profile of the object by combining an absolute phase information calculated from the speckle image and a relation phase information calculated from the structured fringe image so that the known $2\pi$ ambiguities can be completely eliminated thereby improving the inspection depth measuring accuracy while having a large measurable depth range, which cannot achieved by any other conventional surface profilometric methods.

In one exemplary embodiment, the present invention provides a measuring apparatus for three-dimensional profilometry, comprising: a random speckle generating module, generating a random-speckle light beam projecting onto a tested object for forming a reflecting random-speckle beam; a structured fringe generating module, generating a structured fringe light beam projecting onto the tested object for forming a reflecting structured fringe beam; an image acquiring module, detecting the reflecting random speckle beam and the structured reflected fringe beam for generating a random-speckle image corresponding to the reflecting random speckle beam and a structured fringe image corresponding to the reflecting structured fringe beam; and a processing module, determining a profile (depth) information of a tested surface of the object according to the random-speckle image and structured fringe image.

In another exemplary embodiment, the present invention further provides a method for three-dimensional profilometry, comprising steps of: projecting a random speckle light beam and a structured fringe light beam onto a tested object; acquiring a reflecting random speckle beam and a reflecting structured fringe beam respectively for forming a random-speckle image and a structured fringe image; and determining the depth profile of a tested surface of the object according to the random-speckle image and the structured fringe image.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 6E illustrates a plurality of image blocks acquired by using filtering mask onto the random-speckle image;

FIGS. 7A to 7C illustrate deformed variation of random-speckle pattern of image blocks having different surface depths, respectively;

DETAILED DESCRIPTION OF THE INVENTION

For your esteemed members of reviewing committee to further understand and recognize the fulfilled functions and structural characteristics of the disclosure, several exemplary embodiments cooperating with detailed description are presented as follows.

Figure 1:
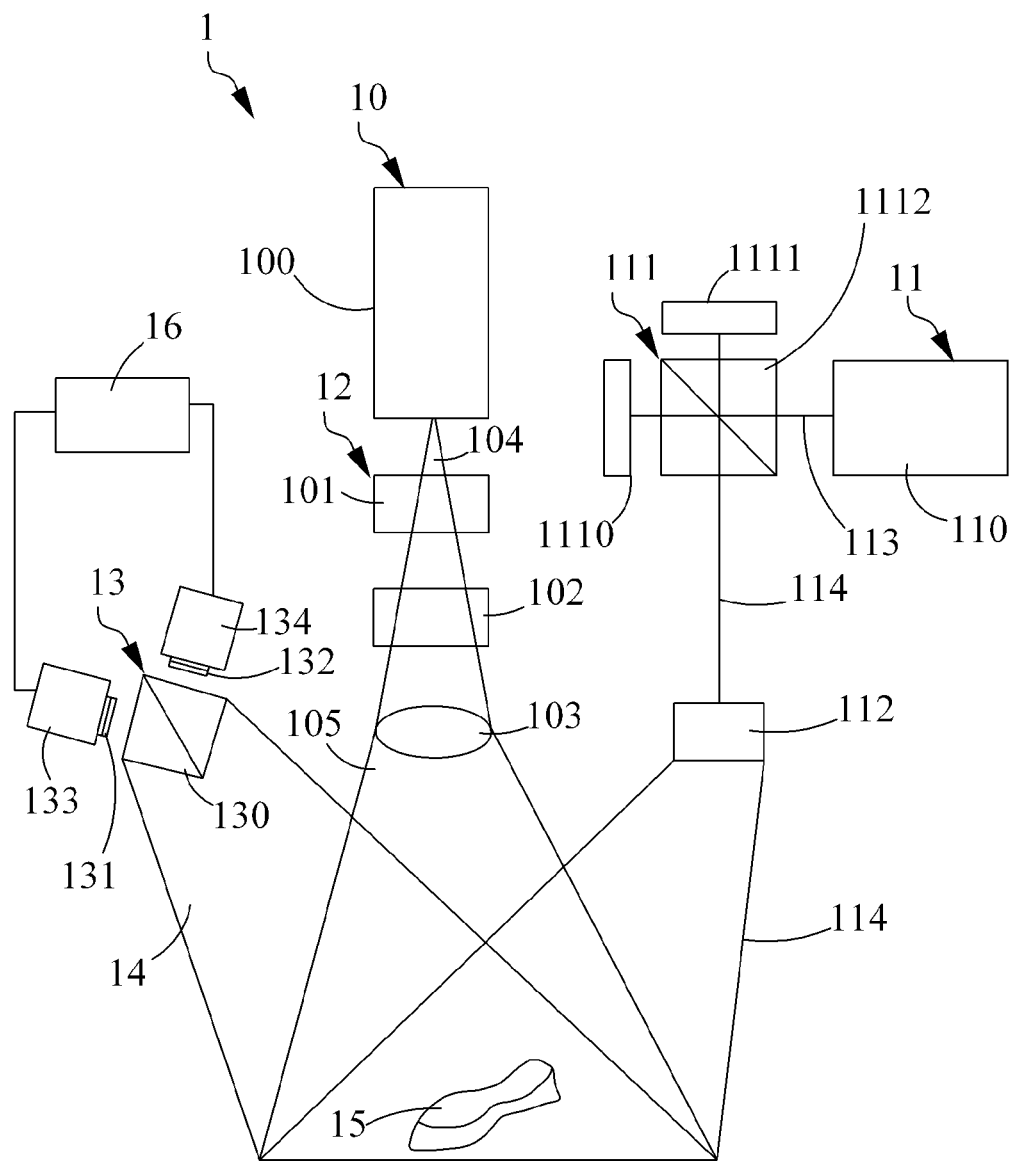
FIG. 1 illustrates a first embodiment of measuring apparatus for three-dimensional profilometry according to the present invention.

Please refer to FIG. 1 which illustrates a first embodiment of measuring apparatus for three-dimensional profilometry according to the present invention. The measuring apparatus 1 comprises a random-speckle generating module 10, a structured fringe generating module 11, an image acquiring module 13, and a processing module 16. The random-speckle generating module 10 generates a random-speckle beam 105. It is noted that the random-speckle beam is referred to a projecting light having randomly distributed pattern without a fixed period. In the present embodiment, the random-speckle generating module 10 comprises a light source 100, and an optical modulation unit 12. The light source 100 can be, but not limited to, a laser source that is capable of generating a first detecting beam 104 having a first specific wavelength such as 770, 780, 790, or 800 nm, or generating a first detecting beam 104 having a wavelength range which ranges from about 700 to 850 nm. Alternatively, the light source 100 can be a white light source or a light emitting diode (LED) for providing a continuous visible spectrum. The optical modulation unit 12 has a modulation element 101, a diffractive element 102, and optical lens 103 which are all arranged along an optical path (or axis) of the first detecting beam 104 for modulating the first detecting beam 104 into the random-speckle light beam 105. It is noted that there has various alternatives for performing the function of the modulation element 101 such as, for example, liquid crystal on silicon (LCOS), or digital micromirror device (DMD). The optical lens 103 is formed by at least one concave lens or at least on convex lens or a combination thereof.

The structured fringe generating module 11 comprises a light source 110, an optical modulation unit 111, and an optical lens 112, wherein the light source 110 can be, but not limited to, a laser source for generating a second detecting beam 113 having a second specific wavelength or wavelength ranges that is different from the wavelength or wavelength range of first detecting beam 105. In the present embodiment, the wavelength of the second detecting beam 113 can be, but not limited to, 530, 531, 532, 534, 534 or 536 nm while the wavelength range of the second detecting beam can range from about 510 to 550 nm. Alternatively, the light source 110 can be a laser source or a light emitting diode (LED) for providing an alternative light source to suit better for more various surface reflective characteristics. The optical modulation unit 111 and the optical lens 112 are arranged along the optical path (or axis) of the second detecting beam 113, whereby the second detecting beam 113 can be modulated into the structured fringe beam 114 after passing therethrough.

In the present embodiment, the optical module 111 is a Michelson type interferometer module which is well-known by the one having ordinary skilled in the art, while, basically, comprising a first flat reference reflecting mirror 1110, a second flat reflecting mirror 1111, and a beam splitter 1112. The second detecting beam 113 is split by the beam splitter 1112 and the two split beams, respectively, project onto the first flat reference reflecting mirror 1110 and the second flat reference reflecting mirror 1111. The reflected split beams, respectively, return to the beam splitter 1112 and are interfered with each other for forming the structured fringe beam 114.

In the embodiment shown in FIG. 1, the random-speckle generating module 10 and the structured fringe generating module 11 are non-coaxially arranged associated with each other and the structured fringe beam 114 and random-speckle beam 105 are spatially overlapped and simultaneously projected onto the surface of the tested object 15. The structured fringe pattern and random-speckle pattern projected onto the surface of the object 15 will be deformed and shifted on the surface of the object when there exists any height variance to the reference plane which has a defined height equal to zero, which are illustrated as FIGS. 7A to 7C and FIG. 11. The two reflected beams 14 including the reflected random-speckle beam and reflected structured fringe beam from the surface of the object 15 will carry the deformed and shifted pattern information and are respectively received by the image acquiring module 13 arranged on the optical imaging path of the two reflected beam 14 for forming images.

In the present embodiment, the image acquiring module 13 further comprises an optical dividing module 130, a first and second filters 131 and 132, a pair of light sensing devices 133 and 134. The optical dividing module 130 divides the two simultaneously reflected beams having the same optical path (OPD) or shifted phase information into two split beams having different optical paths from each other wherein the first filter 131 allows the beams having first wavelength or wavelength range to pass therethrough while the second filter 132 allows the beams having second wavelength or wavelength range to pass therethrough. Accordingly, the split beam containing first wavelength or wavelength range is sensed by the light sensing device 133 so as to form a random-speckle image while the split beam containing second wavelength or wavelength range is sensed by the light sensing device 134 thereby generating a structured fringe image. The random-speckle image and the structured fringe image are processed by the processing module 16 whereby the surface profile information of the tested surface of the object 15 can be obtained and determined. In the present embodiment, the light sensing devices 133 and 134 can be, but not limited to, a charge coupled device (CCD).

It is noted that, in the embodiment shown in FIG. 1, the structured fringe beam and random-speckle beam are simultaneously projected onto the surface of the object which can be employed to inspect surface profile of the object under a undesired vibration environment or to inspect surface profile of a moving object since the measurement can be achieved in one-shot manner. Although the system shown in FIG. 1 is a synchronous projection embodiment, alternatively, in another embodiment, the asynchronous projection of random-speckle beam and structured fringe beam onto the surface of the object can be utilized to inspect the surface of the object. For example, the random-speckle beam is projected onto the surface of the object, and after acquiring reflected random-speckle beam for obtaining the random-speckle image, the structured fringe beam is projected onto the surface of the object subsequently for generating the structured fringe image by acquiring the reflected structured fringe beam. The structured fringe beam and the random-speckle beam are repeatedly projected onto the surface of object in turn. Regarding the detail for determining the surface profile according to the acquired structured fringe and random-speckle images, it will be described hereinafter.

Figure 2:
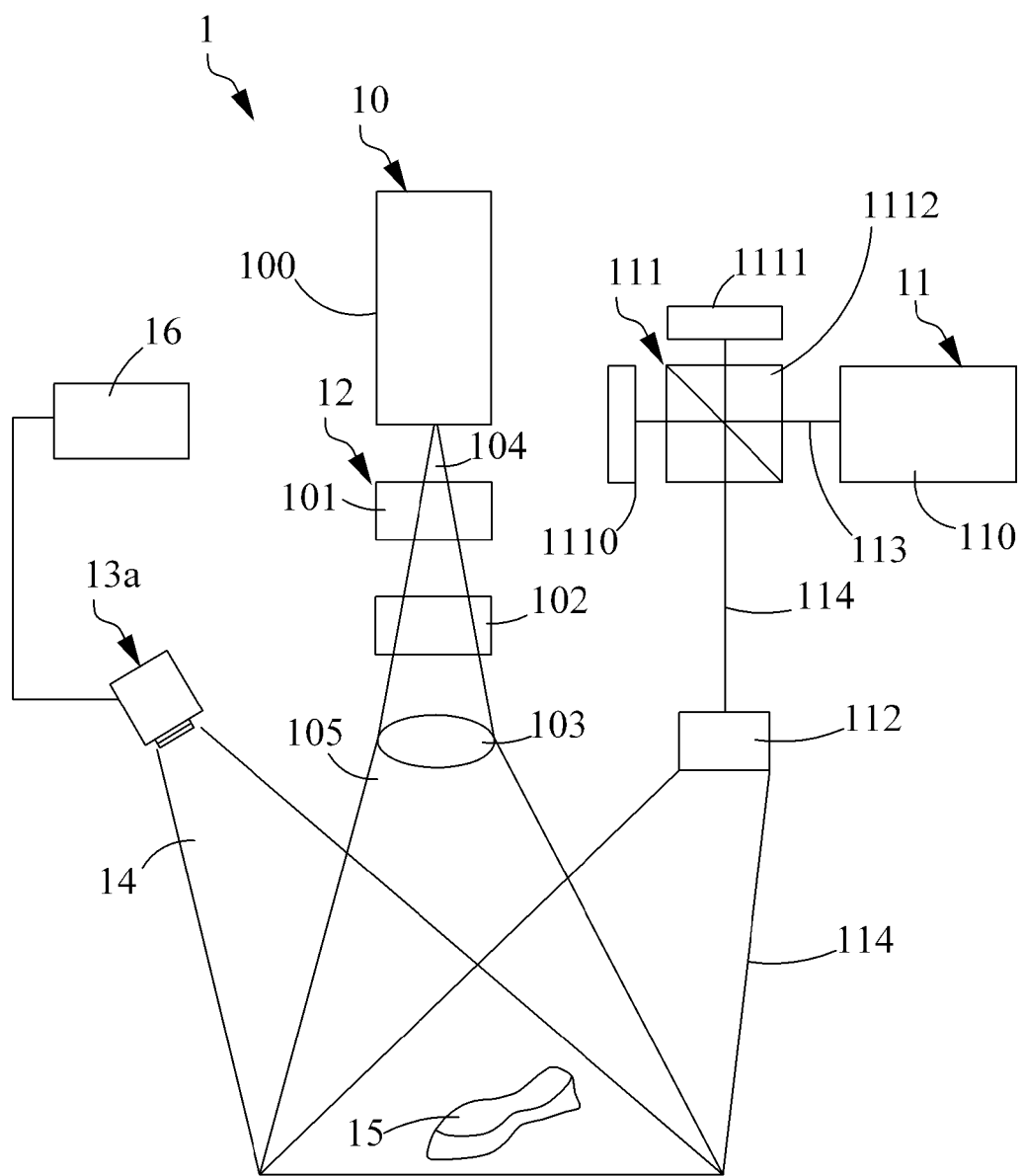
FIG. 2 illustrates a second embodiment of measuring apparatus for three-dimensional profilometry according to the present invention.

Please refer to FIG. 2, which illustrates a second embodiment of apparatus for three-dimensional profilometry according to the present invention. In the present embodiment, it is basically similar to the system shown in FIG. 1; however, the difference is that the image acquiring module 13a of the present embodiment is a module that can be adjusted to sense lights having different wavelength or a module having switchable filters so as to generate structured fringe image or random-speckle image according to the adjusting or switching operation. In another alternative embodiment, while the image acquiring module 13a detects the reflected structured fringe beam 114, the random-speckle beam 105 can be blocked by a mask or the light source 100 can be switched off directly; likewise, while the image acquiring module 13a detects the reflected random-speckle beam 105, the structured fringe beam 114 can be blocked by a mask or the light source 110 can be switched off directly. It is noted that although the reflected structured fringe beam is acquired at first and the reflected random-speckle beam is acquired subsequently, there has no sequential limitation. For example, alternatively, the reflected random-speckle beam can be acquired at first and the reflected structured fringe beam is acquired subsequently.

Figure 3:
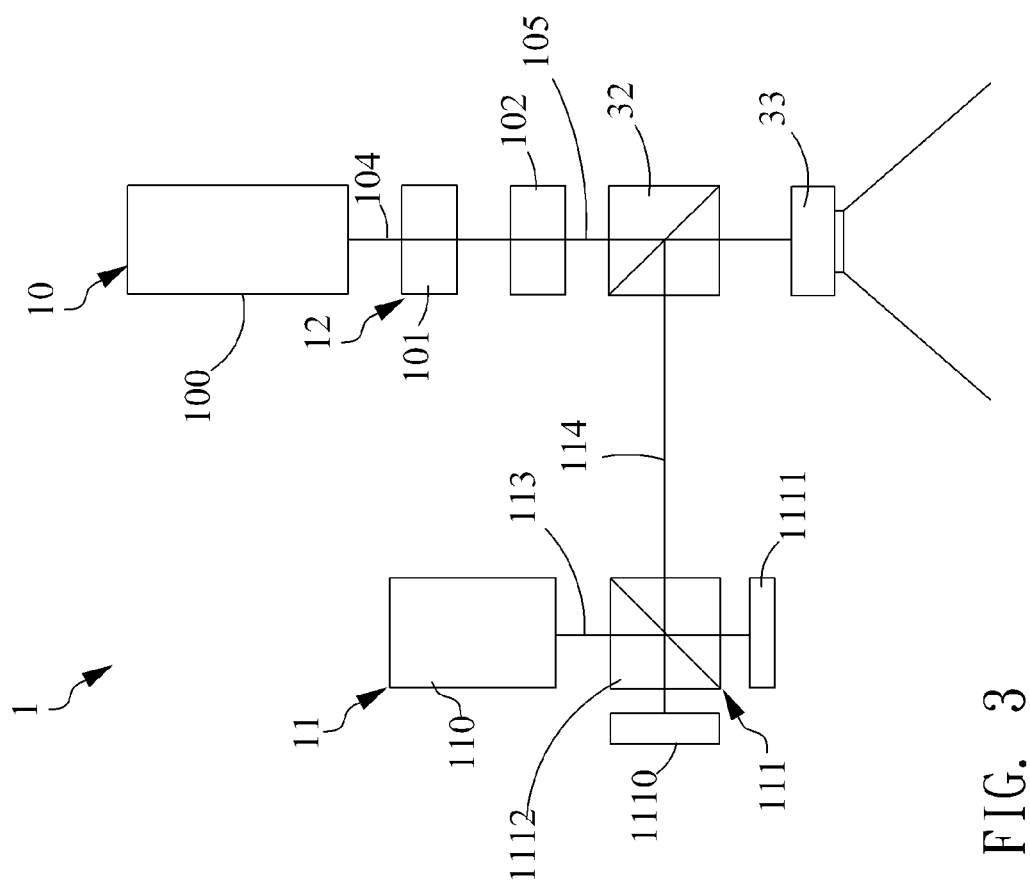
FIG. 3 illustrates a third embodiment of measuring apparatus for three-dimensional profilometry according to the present invention.

Please refer to FIG. 3, which illustrates a third embodiment of three-dimensional profilometry according to the present invention. In the present embodiment, it is basically similar to the first embodiment shown in FIG. 1; however, the difference is the random-speckle beam generated by random-speckle generating module 10 and the structured fringe beam generated by the structured fringe generating module 11 are coaxially aligned to each other. In this embodiment, the structured fringe beam 114 is combined with the random-speckle beam 105 through a first optical element 32, and, thereafter, the combined structured fringe and random-speckle beams pass through a second optical element 33 and project onto the object. In the present embodiment, the first optical element 32 is a beam splitter, and the second optical element 33 is an optical lens having at least one lens.

Figure 4A:
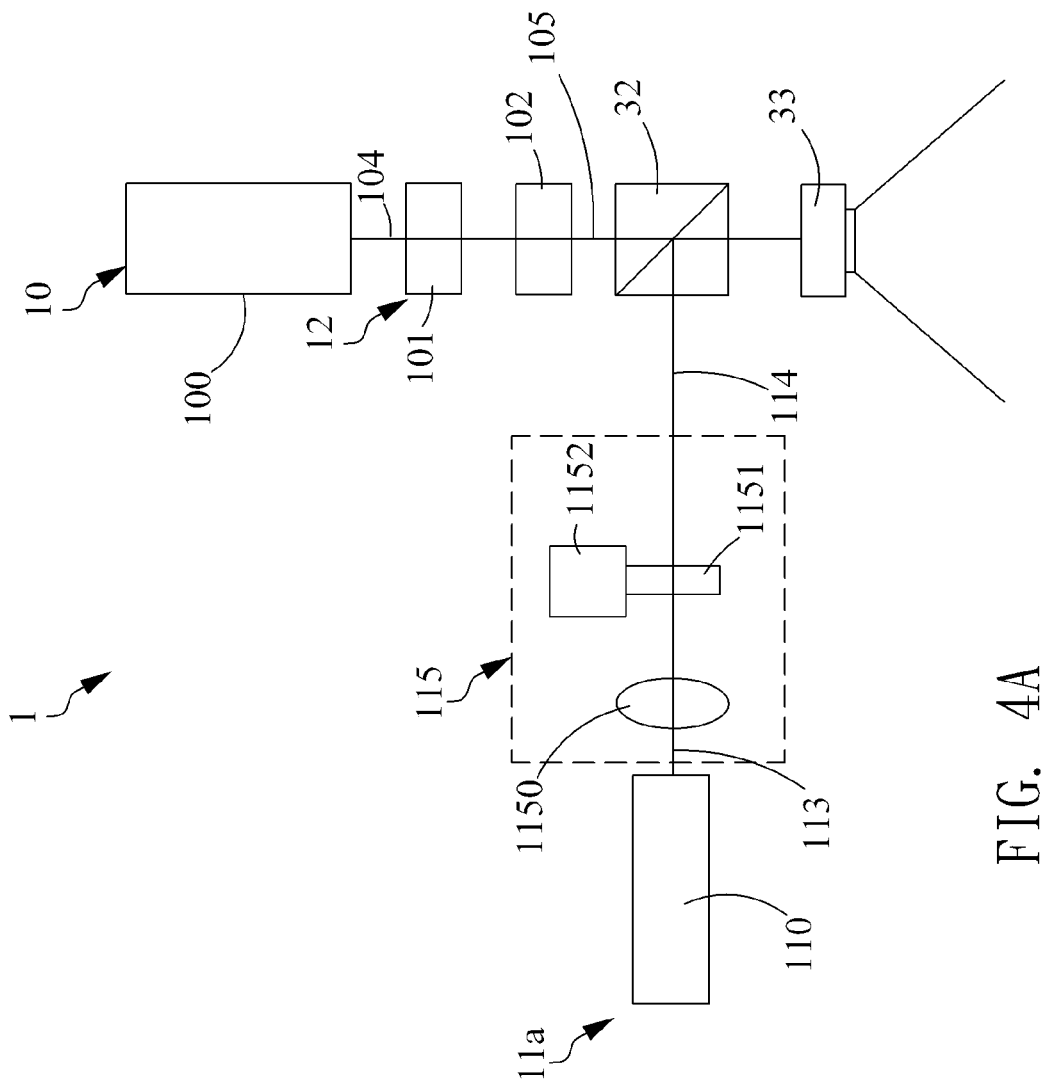
FIG. 4A illustrates a fourth embodiment of measuring apparatus for three-dimensional profilometry according to the present invention.
Figure 4B:
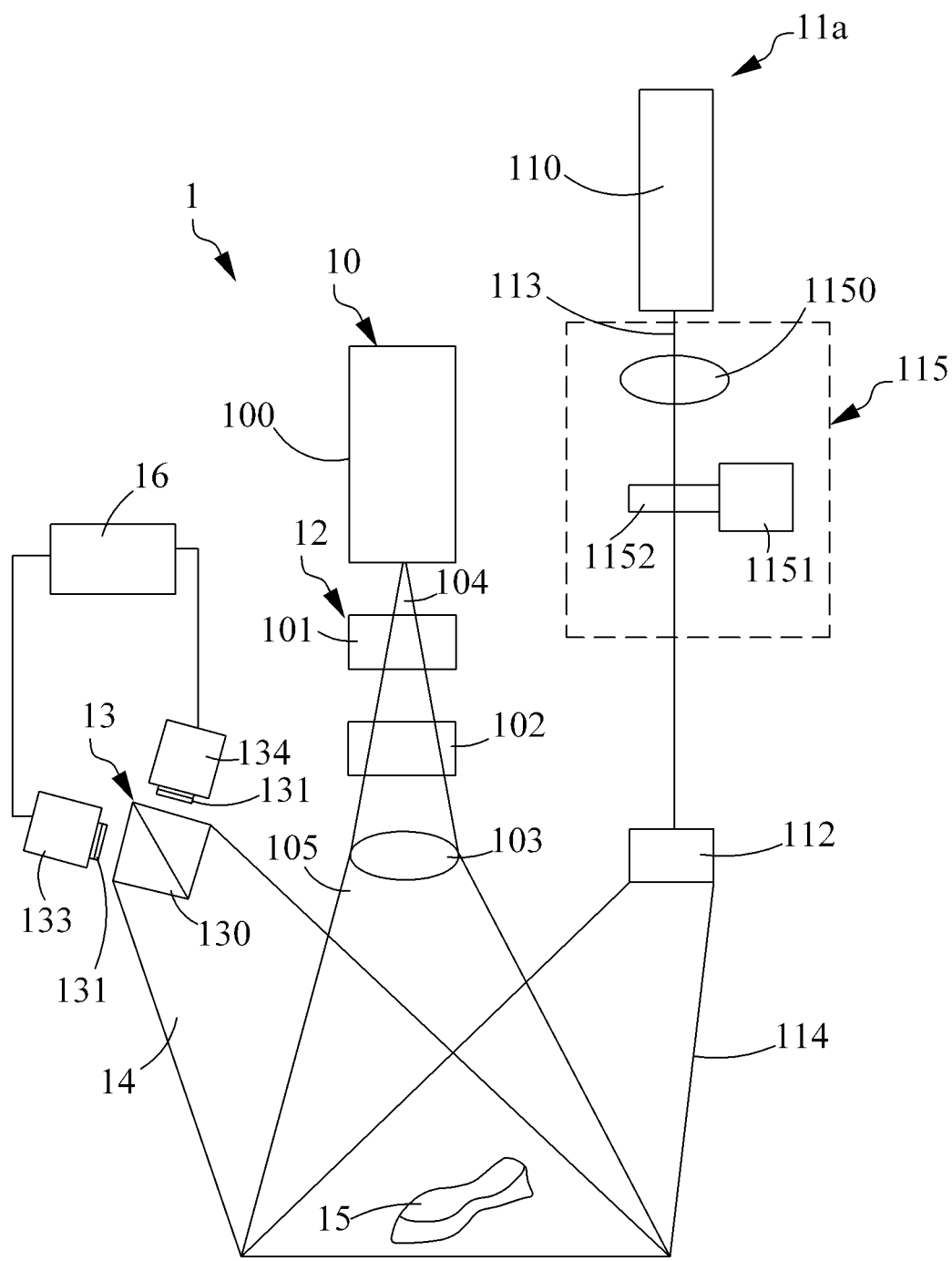
FIG. 4B illustrates another embodiment of measuring apparatus for three-dimensional profilometry according to the present invention.

Please refer to FIG. 4A, which illustrates a fourth embodiment of the three-dimensional profilometry apparatus according to the present invention. Basically, the main part of the apparatus is the same as the embodiment shown in FIG. 3, wherein the difference is that the structured fringe generating module 11a further comprises a light source 110 and an optical modulation module 115 having a lens 1150, an optical grating unit 1151, and a driving unit 1152. The lens 1150 and the optical grating unit 1151 are arranged along the optical path of the second detecting beam 113. The optical grating unit 1151 is coupled to the driving unit 1152 such that the driving unit 1152 can drive the optical grating unit 1151 to move. In the present embodiment, the driving unit 1152 is a motor. The lens 1140 is a convex lens. When the second detecting beam 113 passes through the optical grating unit 1151, the optical grating unit 1151 modulated the second detecting beam 113 into the structured fringe beam 114 projecting onto the first optical element 32. It is noted that, in the present embodiment, the structured fringe beam 114 is coaxially aligned with the random-speckle beam 105 by the first optical element 32. In addition to the coaxially alignment, FIG. 4B illustrates an alternative embodiment that the random-speckle beam 105 and the structured fringe beam 114 are non-coaxially combined with each other to project onto the object 15. Regarding the image acquirement for obtaining the random-speckle image and structured fringe image, it is the same as the previous embodiment, which will be not described in detail hereinafter.

Figure 5:
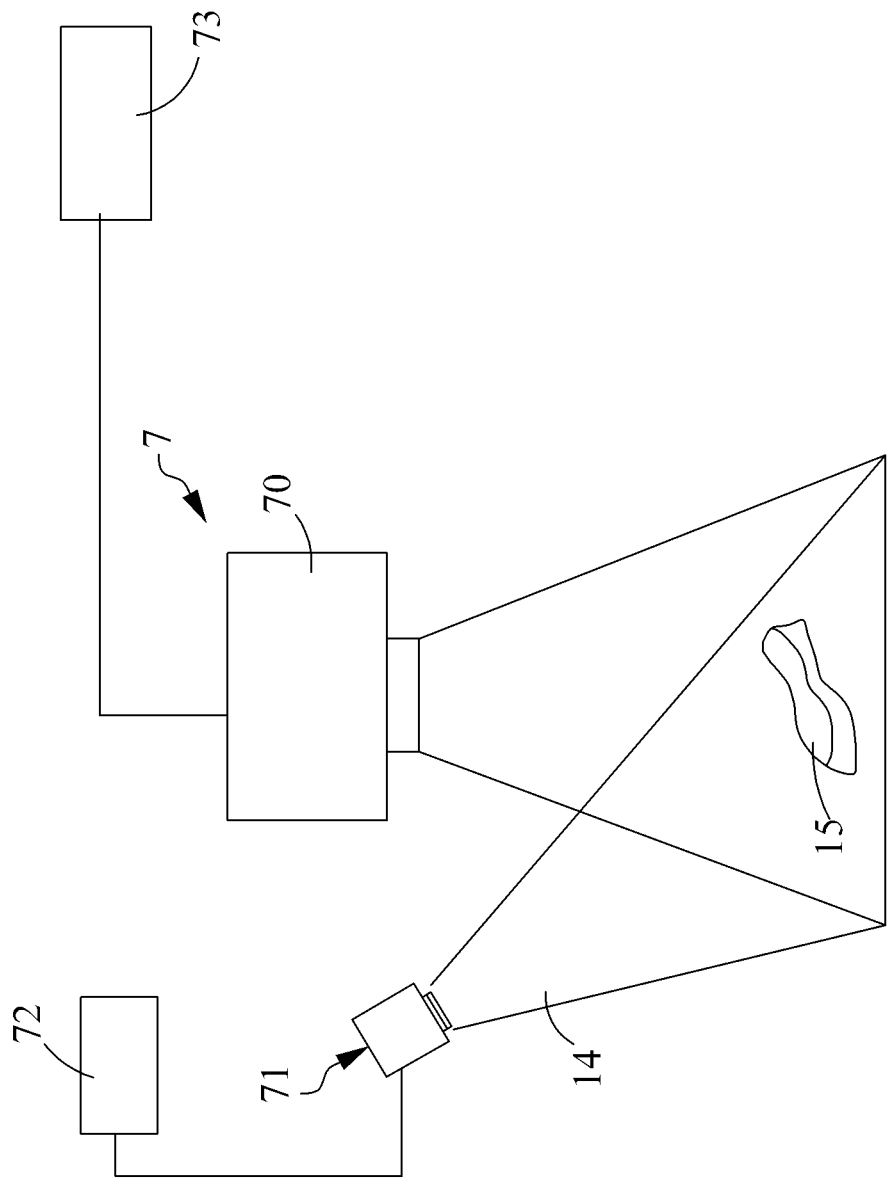
FIG. 5 illustrates another embodiment of measuring apparatus for three-dimensional profilometry according to the present invention.

Please refer to FIG. 5, which illustrates another alternative embodiment of the three-dimensional profilometry apparatus according to the present invention. The apparatus 7 comprises a projecting module 70, an image acquiring module 71, and a processing module 72. The projecting module 70 comprises a digital projecting module such as DLP, or RGB projector. The projecting module 70 is coupled to a computer 73 for receiving a control signal from the computer 73 thereby generating a detecting beam projecting onto the surface of the object 15. The detecting beam can be a random-speckle beam, a structured fringe beam or a combination of the random-speckle beam and the structured fringe beam. The image acquiring module 71 acquires the reflected light from the surface of the object 15 so as to generate a random-speckle image and a structured fringe image. The processing module 72 determines a surface depth of a specific position on the object surface according to the random-speckle image and the structured fringe image. It is noted that although, in the present embodiment, the projecting module 70 utilizes a single projector for generating the random-speckle beam and structured fringe beam, alternatively, it is capable of utilizing two projectors to form the projecting module 70, wherein one projector is adapted to generate the random-speckle beam while the other projector is adapted to generate the structured fringe beam.

Next, the method for determining the surface depth of each position on the object surface is explained below. At first, the principle of structured fringe analysis is described in detail hereinafter. The deformed fringes pattern is analyzed to obtain the surface depth of corresponding position through Fourier transformation or phase-shift analysis.

Generally speaking, since the structured fringe beam projected onto the object surface is a structured light having sinusoidal pattern, which can be expressed as equation (1) shown below, wherein "x" and "y" respectively represents row numbers and column numbers within the image coordinate system, "a" is referred to the optical intensity of background light of the acquired image, "b" is referred to optical intensity of the sinusoidal pattern, φ(x,y) is referred to phase distribution of the object, and n(x,y) is referred to the noise intensity.

$$I(x,y)=a(x,y)+b(x,y)\cos[\phi(x,y)]+n(x,y) \quad (1)$$

The φ(x,y) in equation (1) can be further divided into a carrier phase $\phi_c$(x,y) and initial phase $\phi_0$(x,y), which is further expressed as equation (2) shown below, wherein the carrier phase $\phi_c$(x,y) can be expressed as equation (3) shown below, wherein fc,x and fc,y respectively represents a spatial frequency in horizontal direction and vertical direction in frequency domain.

$$\phi(x,y)=\phi_c(x,y)+\phi_0(x,y) \quad (2)$$

$$\phi_c(x,y)=2\pi(f_{c,x}x+f_{c,y}y) \quad (3)$$

According to the equation (2) and (3), an equation (4) can be formed in the following, which can be further reformed as equation (5) shown following the equation (4).

$$I(x,y)=a(x,y)+b(x,y)\cos[\phi_c(x,y)+\phi_0(x,y)]+n(x,y) \quad (4)$$

$$I(x,y)=a(x,y)+[b(x,y)\cos\phi_c(x,y)\cos\phi_0(x,y)-b(x,y)\sin\phi_c(x,y)\sin\phi_0(x,y)]+n(x,y) \quad (5)$$

It is assumed that c(x,y)=0.5b(x,y)exp[jφ$_0$(x,y)] whereby c(x,y) is substituted into equation (6) thereby obtaining equation (7) shown below.

$$I(x,y)=a(x,y)+0.5b(x,y)[\cos\phi_c(x,y)+j\sin\phi_c(x,y)][\cos\phi_c(x,y)+j\sin\phi_0(x,y)]+0.5b(x,y)[\cos\phi_c(x,y)-j\sin\phi_c(x,y)][\cos\phi_0(x,y)-j\sin\phi_0(x,y)]+n(x,y) \quad (6)$$

$$I(x,y)=a(x,y)+c(x,y)e^{j\phi_c(x,y)}+c(x,y)e^{-j\phi_c(x,y)}+n(x,y) \quad (7)$$

The equation (7) is processed by Fourier transformation operation so as to obtain equation (8) shown below.

$$I(f_x,f_y)=A(f_x,f_y)+C(f_x-f_{c,x},f_y-f_{c,y})+C^*(f_x+f_{c,x},f_y+f_{c,y})+N(f_x,f_y) \quad (8)$$

After the Fourier transformation, a distortion information C(f$_x$−f$_{c,x}$,f$_y$−f$_{c,y}$) corresponding to the structured fringe beam projected onto the object surface within frequency domain is obtained. The distortion information is further processed by a band-pass filter and the distortion information is converted into a phase wrapping information by an inverse Fourier transformation. After that, the phase wrapping information is converted into a continuous phase distribution according to process of phase restoration, wherein the continuous phase distribution can be transformed into surface depth information for three-dimensional surface profile construction.

Since it is necessary to calculate a phase difference for reconstructing three-dimensional surface profile of the object, the structured fringe beam is projected onto the object with n times phase shift, wherein N is great or equal to 1.

The phase shift can be represented by β=2π/N, in which N represents the phase-shifting times, whereby the structured fringe intensity of acquired image corresponding to each phase shift can be expressed as equation (10) shown below, wherein $I_N$(x, y, t) represents optical intensity of the structured fringe pattern corresponding to each phase shift. Since there has three unknown terms I' (x, y), I" (x,y), and φ (x,y) in equation (10), it is necessary to perform at least three times of phase shift for obtaining three equations whereby the unknown terms I' (x, y), I" (x,y), and φ (x,y) can be resolved. Thereafter, a least square algorithm is utilized to obtain equations (11-13) listed below.

$$I_N(x, y, t) = I'(x, y) + I''(x, y) \cos[\psi(x, y) + n\beta] \quad (10)$$

$$\phi(x, y) = \tan^{-1}\left[\frac{-a_2(x, y)}{a_1(x, y)}\right] \quad (11)$$

$$\gamma(x, y) = \frac{\sqrt{a_1(x, y)^2 + a_2(x, y)^2}}{a_0(x, y)} \quad (12)$$

$$\phi(x, y) = \tan^{-1}\left[\frac{\sum_{i=0}^{N-1} Ii(x, y)\sin(\delta_i)}{\sum_{i=0}^{N-1} Ii(x, y)\cos(\delta_i)}\right] \quad (13)$$

Accordingly, either Fourier transformation or phase-shifting analysis can be adapted to phase calculation.

In the next, a principle of random-speckle image analysis is described in detail hereinafter. Basically, the surface depth of a specific position on the object surface is calculated according to a deformed image corresponding to the specific position and a plurality of random-speckle image samples, stored in a database, respectively corresponding to different standard depth, wherein each random-speckle image sample has n×n pixel size of, wherein n is an odd pixel number. Basically, the plurality of random-speckle image samples are formed by acquiring a plurality reference images respectively corresponding to a specific standard depth and each reference image is divided into a plurality of random-speckle image samples by a mask having the same size as the image sample so that, for each specific position, the image samples corresponding to difference standard depth can be established in the database. Thereafter, the acquired deformed random-speckle image of the object underlying test is divided into a plurality of image blocks by the same mask. The center of each image block is referred to an inspected position on the object surface. Then, each image block is subsequently compared with the plurality of random-speckle image samples corresponding to the position of compared image block, wherein each random-speckle image sample is corresponding to difference standard depth. Since each random-speckle image sample has unique or non-repeated random-speckle pattern, the deformed pattern with respect to the specific depth will not repeat so that those random-speckle image samples corresponding to the inspected position can be utilized to compare with the random-speckle pattern in the acquired image block, whereby the calibrated depth of the random-speckle image sample having random-speckle pattern that is identical or most similar to the pattern of the image block is mapped to the surface depth of the center pixel (position) of the image block. For each image block, the same procedure foregoingly described is repeated till all the surface depth of the center of each image block is determined. Then the surface depth of each image block is converted into the surface depth of the object underlying test by triangulation transformation.

Figure 6B:
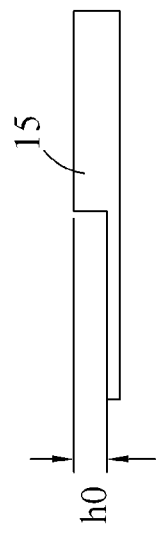
FIGS. 6B to 6D are the schematic diagrams illustrating that the random-speckle lights are projecting onto object having different heights.
Figure 6C:
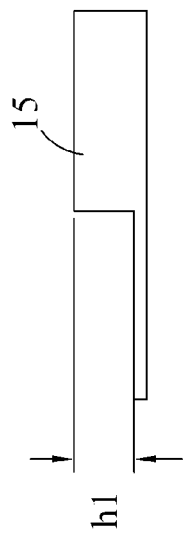
Figure 6D:
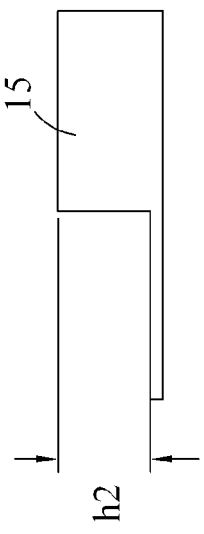
Figure 6A:
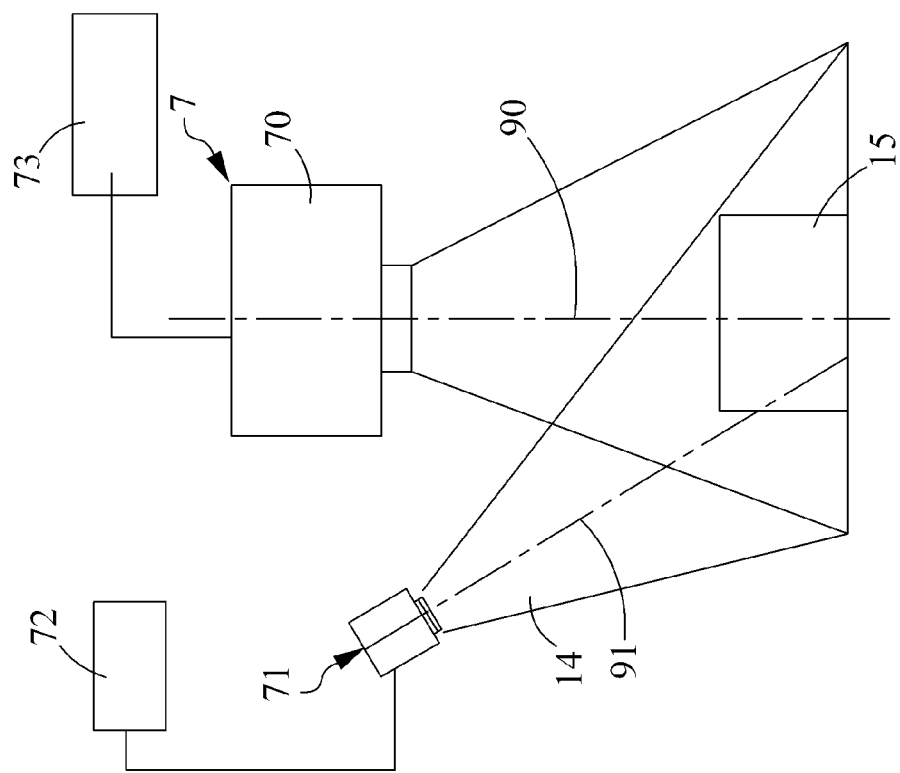
FIG. 6A illustrates using the measuring apparatus for three-dimensional profilometry shown in FIG. 5 to detect the object surface profile.

Please refer to FIG. 6A which illustrates the random-speckle beam projected onto the object having different heights shown in FIGS. 6B to 6D, wherein the apparatus illustrated in FIG. 5 is utilized to be the exemplary embodiment shown in FIG. 6A. In the present embodiment, the reflected random-speckle beam from the object is acquired by the image acquiring module 71 thereby forming a random-speckle image 92 shown in FIG. 6E. When it comes to analyze the random-speckle image 92, a mask 8 is utilized to acquire an image block 920 for analyzing the surface depth, wherein the analyzed surface depth is referred to the center 921 of the image block 920 whereby a specific position on the object surface corresponding to the center 921 of the image block 920 can be mapped and determined. After that, the mask is moved to the next position for filtering another image block. It is noted that the moving distance can be determined according to the lateral resolution need of inspection. For example, if the higher inspection resolution is required, the moving distance can be adjusted to be the scale of single pixel or subpixel whereas if the coarser inspection resolution is enough, the moving distance each time can be adjusted to the width of the mask. In addition, the size of the mask is formed by n×n pixels, wherein n is referred to an odd number such as, for example, 7 (pixels)×7 (pixels) and 13(pixels)×13 (pixels), which is determined according to the mapping accuracy. However, the higher n becomes, the longer the mapping processing time takes.

The following description explains an exemplary embodiment for establishing the database. Please refer to FIGS. 6A-6D and 7A-7C, wherein FIGS. 7A to 7C illustrate image blocks acquired by the mask. In FIG. 6A, a gauge block has different step heights such as the blocks having height h0~h2, respectively, shown in FIGS. 6B to 6D. When the gauge block is arranged in the system shown in FIG. 6A, the random-speckle beam is projected onto the surface of the gauge block such that the random-speckle pattern of the random-speckle beam will deform or shift corresponding to the step height of the gauge block and the deformation will vary from the gauge blocks having a different step height. Since the pattern of the random-speckle beam and the step height of the gauge block are known, it is capable of establishing a database of the image samples with the deformed pattern, respectively, corresponding to a different depth at a tested position.

Taking a position P at a lateral side 150 of the step gauge block 15 shown in FIG. 6E as an example, the image block having deformed pattern acquired by the mask will be varied with respect to the gauge block having a different height, $h_0$~$h_2$. When the gauge block having the step height, $h_0$, is projected by the random-speckle beam, the image acquired is illustrated as FIG. 7A. It is noted that the image block 920 corresponding to the position P with the random-speckle pattern acquired by the mask 8 is slightly deformed. Likewise, for the other gauge block having step height $h_1$ or $h_2$, the image block corresponding to the position P with the random-speckle pattern acquired by the mask 8 are varied from each other, which are illustrated as FIGS. 7B and 7C. Since the random-speckle beam has a randomly distributed pattern without a fixed period, unlike a structured fringe used in the phase-shift profilometry, the deformed pattern will not be repeated with ambiguity after a certain variation of step height so that the surface depth of the object underlying test can be correctly determined no matter how the surface variation will be or there exists a surface discontinuity. On the basis of this advantage, if the database of the random-speckle pattern corresponding to different depth and different position can be established in advance by system calibration, the surface depth of the object underlying test can be analyzed.

Figure 8:
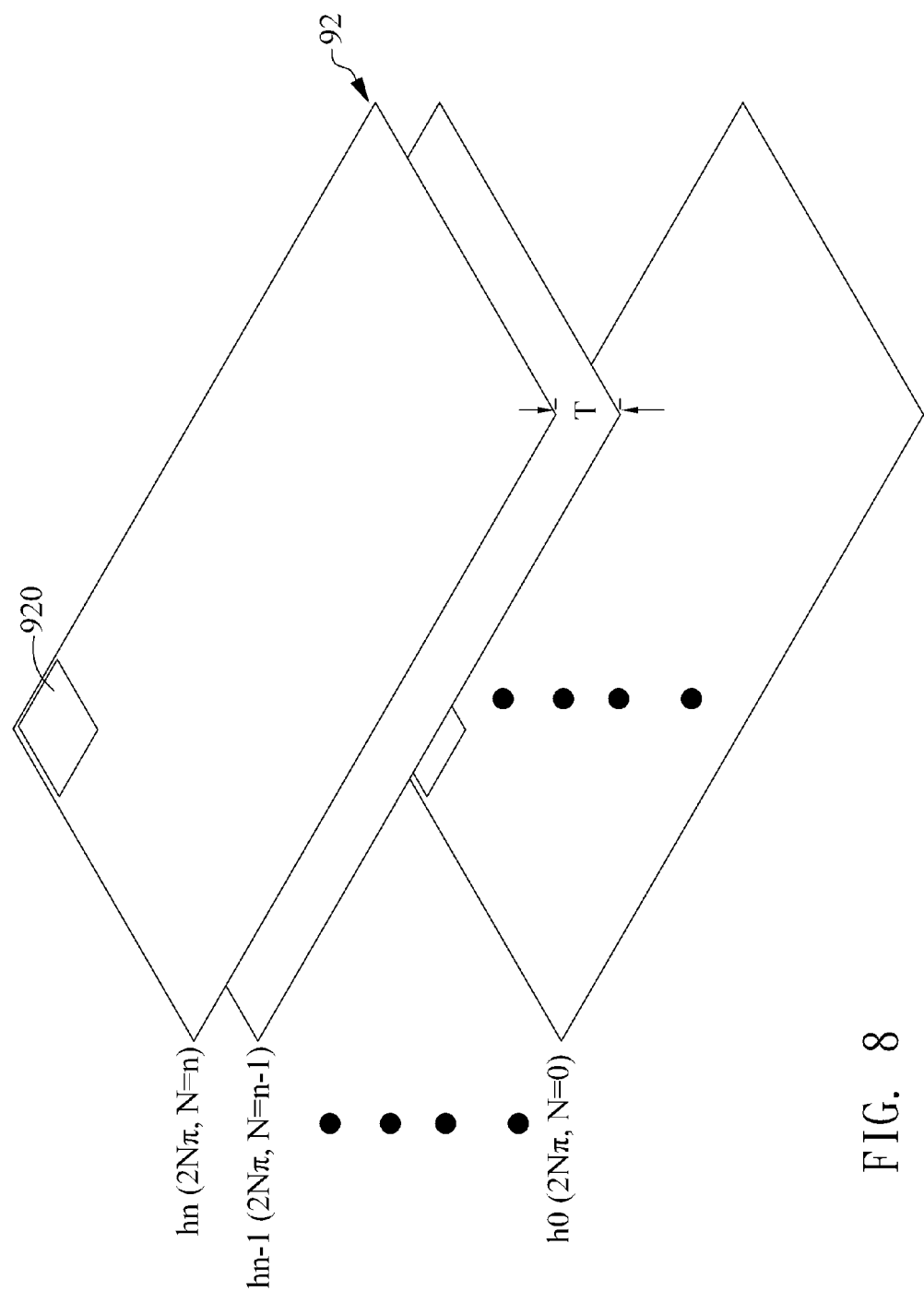
FIG. 8 illustrate a schematic graph for establishing image samples of a database respectively with respect to different standard depth.

Please refer to FIG. 8, which illustrates a database having a plurality of image samples corresponding to different tested positions and pre-calibrated depths $h_0$~$h_n$. In one embodiment, the amount of the image samples is n×m, wherein the n and m respectively refer to the pixel size of each random-speckle image acquired by the image acquiring module. It should be noted that the size and amount of the image samples are determined according to the resolution need and computer operating capability, and it should not be limited to the present embodiment. In addition, the depth difference between two adjacent random-speckle images is equal to the depth that can be analyzed according to the fringe period, T, of the structured fringe beam, i.e. corresponding to the width of the fringe pattern. Therefore, when the random-speckle image is acquired, the image block corresponding to the each position of the object underlying test can be obtained through a matching mask (window) having the same pixel size as the image sample and the image blocks corresponding to each position on the object surface are utilized to compare with the samples image in the database by adequate image matching algorithms such as cross correlation algorithm, thereby the relative height of each position on the object surface can be calculated.

Figures 9A, 9B:
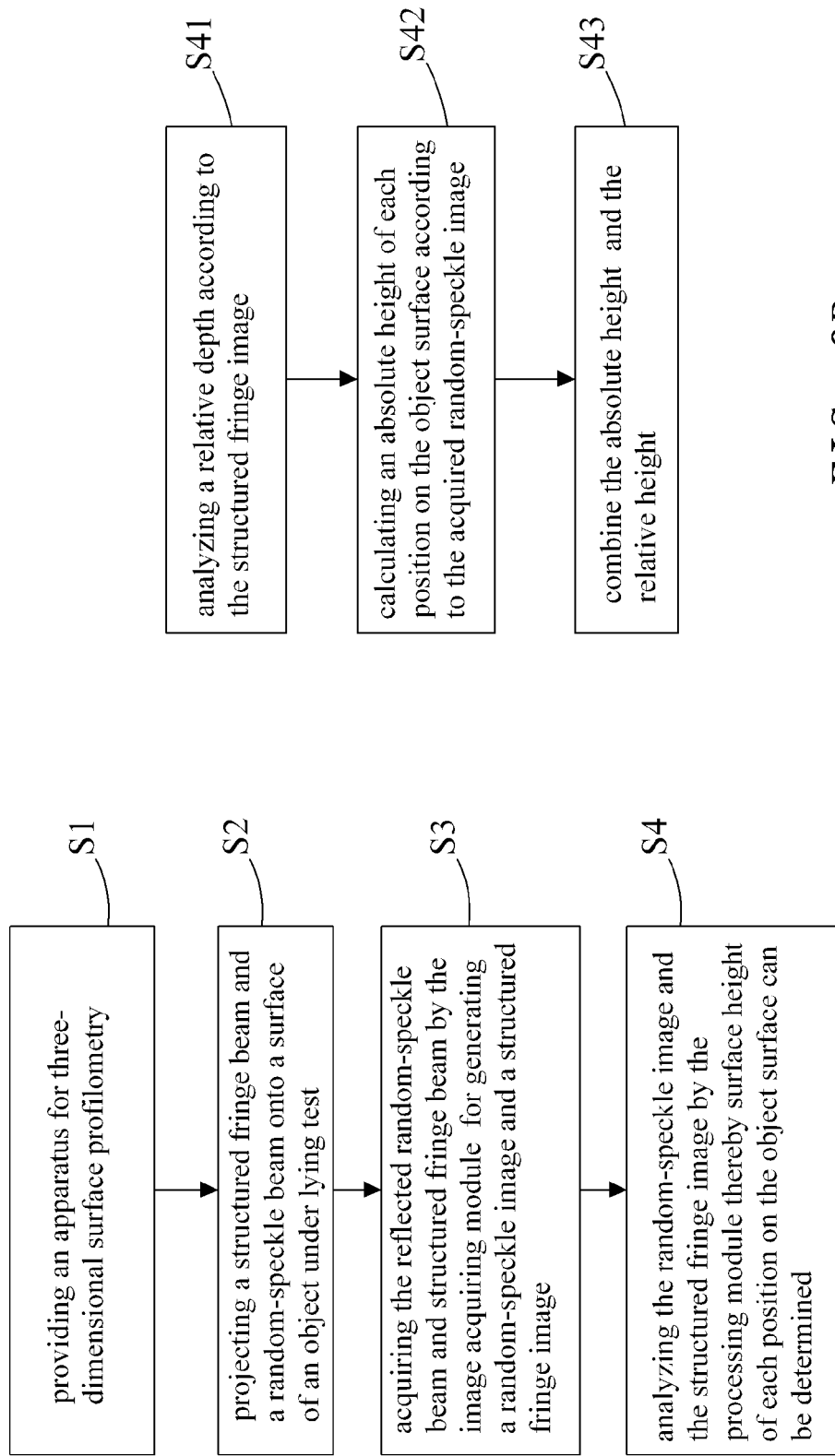
FIGS. 9A, 9B and 10 illustrate a flow of a method for measuring three-dimensional profilometry according to the present invention.

Please refer to FIG. 9A, which illustrates a flow of three-dimensional surface profilometry according to one embodiment of the present invention. In step of S1, an apparatus for three-dimensional surface profilometry is provided. It is noted that the apparatus can be any one of the foregoing embodiments such as the apparatus shown in FIGS. 1-5. In the following explanation, the apparatus shown in FIG. 1 is utilized as an exemplary for explanation. The step of S2 is performed by projecting a structured fringe beam and a random-speckle beam onto a surface of an object underlying test. In the present step, the random-speckle beam is generated by the random-speckle generating module 10 while the structured fringe beam is generated by the structured fringe generating module 11. The reflected random-speckle beam and structured fringe beam from the object surface contain the deformed random-speckle and structured fringe patterns corresponding to the surface depth information of the object. After that, a step S3 is proceeded to acquire the reflected random-speckle beam and structured fringe beam by the image acquiring module 13 for generating a random-speckle image and a structured fringe image. Finally, in step S4, the random-speckle image and the structured fringe image are analyzed by the processing module 16 whereby the surface depth of each position on the object surface can be determined.

In the step S4, shown in FIG. 9B, it further comprises a step S41 which is performed by utilizing the processing module 16 to analyze a relative depth according to the acquired structured fringe image. In the present step, since the fringe beam is a structured light having a sinusoidal pattern, a Fourier transformation or phase-shifting phase retrieval principle can be adapted to analyze the structured fringe image thereby obtaining the surface depth, i.e. the relative depth defined from the calibrated reference surface, associated with the acquired structured fringe image. During the analysis, a relative phase information of each inspected position (x,y) on the object surface can be denoted as $\Delta\phi_f(x,y)$ which represents the phase difference of deformed structured fringe pattern of each inspected position (x,y) wherein the phase difference is ranged within $\pm\pi$.

Figure 11:
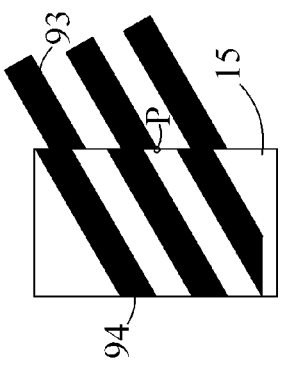
FIG. 11 illustrates misalignment of deformed fringes on a specific position of the structured fringe image having step height.

Taking the illustration shown in FIG. 11 as an example, it is assumed that the position P on a lateral side of the object 15 has a step height such that the structured fringe pattern projected onto the position P is deformed. Accordingly, two phase information with respect to the position P can be obtained wherein one is corresponding to the structured fringe pattern 93 while the other is corresponding to the structured fringe pattern 94. After a calculation, a phase difference between the two phase information corresponding to the two fringe patterns 93 and 94 at the tested position P can be obtained. The phase difference can be utilized to calculate the relative depth corresponding to the position P through a phase restoration calculated by the processing module 16.

Next, after the step S41, the step S42 is performed to calculate an absolute height of each inspected position on the object surface according to the acquired random-speckle image. In the present step, shown in the flow of FIG. 10, it further comprises a step 421 for determining a depth phase information of each inspected position of the object surface according to the random-speckle image and converting depth phase information into a combination of an absolute phase information and a phase difference information. In the present step, through the database established in FIG. 8, surface depth $H_s(x,y)$ corresponding to each position (x,y) on the object surface can be determined using cross correlation matching. The surface depth $H_s(x,y)$ corresponding to each position (x,y) can be converted into a phase value which is a combination of the absolute phase information and the phase difference information.

Figure 12A:
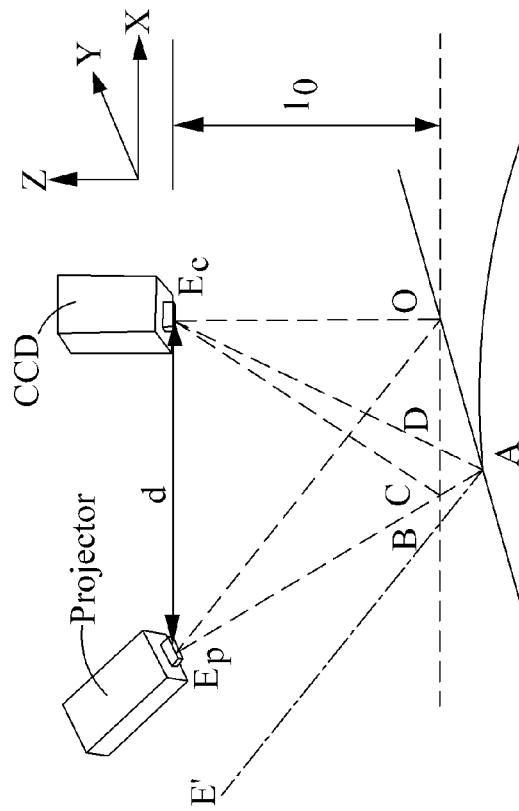
FIG. 12A illustrates a schematic diagram of optical projection for phase restoration.

The conversion between depth and phase information is explained below. In order to obtain surface depth information $H_s(x,y)$, it is necessary to utilize the phase information $\phi(x,y)$ obtained from the phase restoration to reconstruct the three-dimensional surface profile of the tested object. The FIG. 12A illustrates an optical projection system for explaining the relation between the depth and phase information.

When the structured fringe pattern is projected onto a pre-calibrated reference plane, basically, the image with respect to the point C is generated by the image acquiring module such as CCD arranged at position $E_c$; however, since the structured fringe pattern is reflected at position D, there has a shifting distance CD between the original position C and reflected position D. It is capable of defining two similar triangles ACD and $AE_pE_c$ according to the geometric relation for determining the shifting distance CD, which is illustrated as function (14) shown below:

$$\overline{CD} = \frac{-dh(x,y)}{[l_0 - h(x,y)]} \quad (14)$$

Meanwhile, the phase difference $\Delta\phi(x,y)$ can also be expressed as equation (15) shown below, wherein d represents a distance between an optical axis of the projector and an optical axis of the image acquiring module, $l_0$ represents a distance between the image acquiring module and the reference plane, $f_0$ represents a frequency of the structured light generated by the projector.

$$\Delta\phi(x,y) = \phi(x,y) - \phi_0(x,y) = 2\pi f_0 \overline{CD} \quad (15)$$

Since the field scope of the projector is the same as the field scope of the image acquiring module, the pixels of the structured fringe image and the random-speckle image are spatially the same with each other. Accordingly, the phase information of the corresponding pixels of the random-speckle image and the structured fringe image can be matched and combined which will be described in details hereinafter.

According to the Fourier transformation or phase-shifting analysis, the phase difference with respect to a specific position or pixel can be denoted as $\Delta\phi_f(x,y)$. In addition, according to the foregoing explanation about the random-speckle image for determining the depth information, the depth information with respect to each inspected position is denoted as Hs(x,y), which is converted into a phase difference $\Delta\phi_s$ corresponding to the phase-shifting profilometry (PSP) or Fourier transform profilometry (FTP) expressed as equation (16).

$$\Delta\phi_s = \frac{2\pi \times f_0 \times H_s(x, y)}{L - H_s(x, y)} \quad (16)$$

Figure 12B:
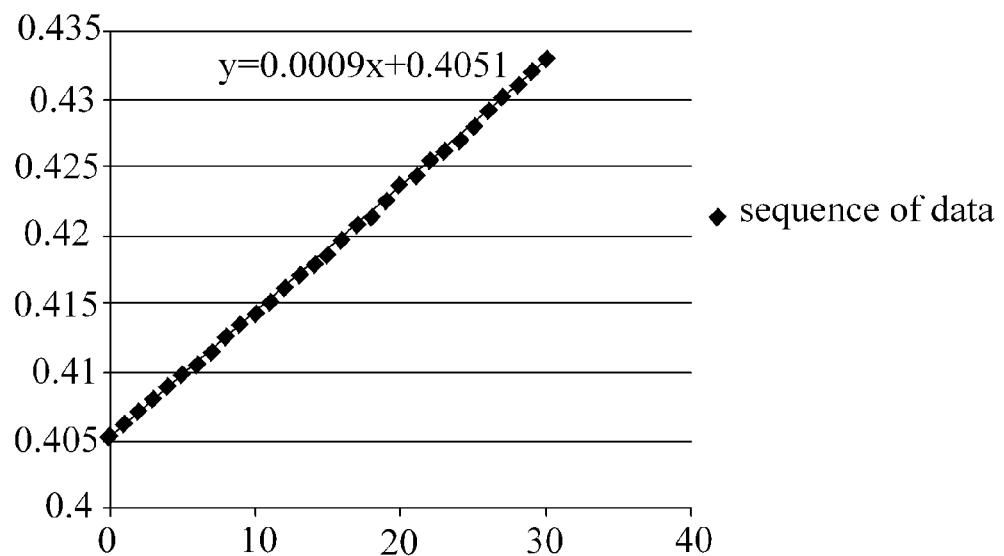
FIG. 12B illustrates a relationship curve between frequency of fringe patterns and depth.

In the equation 16, $f_0$ represents the spatial frequency which is varied with respect to the surface depth of each inspected position (x,y). According to the analysis between the fringe frequency and different surface depth, it is found that the spatial frequency of the fringe pattern has a linear relationship with the surface depth, which is clearly illustrated in FIG. 12, wherein the horizontal axis represents the surface depth while the vertical axis represents the fringe frequency. Accordingly, a linear equation can be least-squares fitted by the curve fitting analysis. Since the surface depth of each specific position or pixel (x,y) can be obtained according to the random-speckle image analysis first, the spatial frequency $f_0$ can be appropriately determined according to the surface depth and fitted linear equation, whereby an accurate measuring result of the tested point can be obtained when a conversion between the phase and surface depth is performed according to the equation 16. It is noted that, comparing to the conventional way of taking the spatial frequency as a constant value or assuming L>>H such that (L–H$_S$) can be regarded as L, the way for determining $f_0$ in the present embodiment can improve the accuracy when determining the spatial frequency $f_0$.

Once $\Delta\phi_s$(x,y) is calculated by equation 16, a value N can be calculated according to an equation (17), wherein N represents the least numbers of period $2\pi$ by comparing the $\Delta\phi_s$(x,y) obtained by equation (16) and $\Delta\phi_f$(x,y) obtained by Fourier transformation or phase-shifting analysis.

$$N = MINT\left[\frac{\Delta\phi_s(x, y) - \Delta\phi_f(x, y)}{2\pi}\right] \quad (17)$$

Once the N is obtained, the $\Delta\phi_s$(x, y)–$\Delta\phi_f$(x, y) which is represented as $\Delta\phi$ can be expressed as equation (18), wherein $2N\pi$ represents the absolute phase information, in which N (the wave number) can be ranged from 0 to n, wherein n is a positive integer and $\Delta\phi_s$ (x, y) represents the difference between the depth corresponding to $2N\pi$ and the depth, $H_s$(x,y), determined by random-speckle image, i.e., the phase difference information defined in step 421.

$$\Delta\phi_s = \Delta\phi_s(x,y) + 2N\pi \quad (18)$$

Further, according to the equation (16) and (18), the $H_s$(x,y) obtained from the random-speckle image can be converted into equation (19) shown below.

$$H_s = \frac{(\Delta\varphi_s(x, y) + 2N\pi) \times L}{2\pi f D + \Delta\varphi_s} \quad (19)$$

Since $\Delta\phi_s$(x, y) is calculated by interpolation calculation, it is not accurate. Accordingly, the phase information of $\Delta\phi_f$(x, y) obtained according to the step S41 is substituted for $\Delta\phi_s$(x, y) such that the equation (19) can be further converted into equation (20) shown below.

$$H = \frac{(\Delta\phi_f(x, y) + 2N\pi) \times L}{2\pi f D + \Delta\phi_f} \quad (20)$$

Thereafter, a step S422 is performed to convert the phase information $2N\pi$ into an absolute depth information by looking up the database storing the pre-calibrated image sets illustrated in FIG. 8. Please referring to FIG. 9B, finally, a step S43 is performed to combine the absolute depth determined according to phase information $2N\pi$ and the relative depth determined according to the phase information $\Delta\phi_f$(x, y) whereby the surface depth of the specific position P can be obtained.

Figure 10:
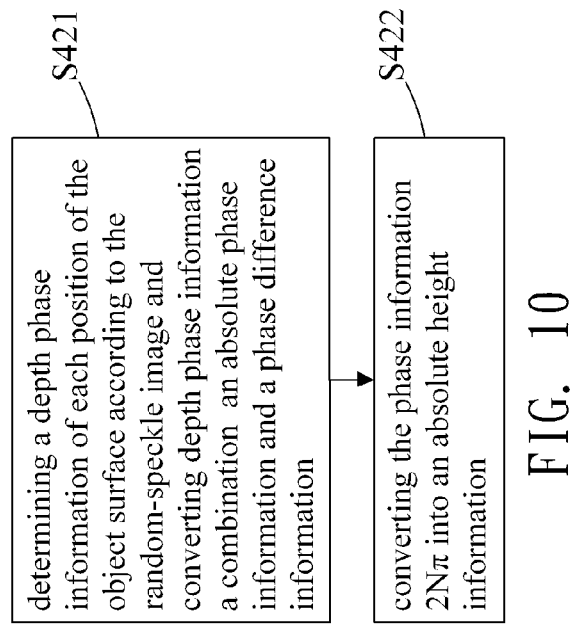

Likewise, according to the procedures shown from FIG. 9A to FIG. 10, the surface depth of the other positions on the object surface can be determined. By means of combining the absolute depth information obtained from random-speckle image and relative depth information obtained from the structured fringe image, it can improve the insufficient accuracy in the conventional speckle profilometry as well as the limitation of step height measurement of the conventional phase-shifting profilometry.

EXAMPLES

Figure 13:
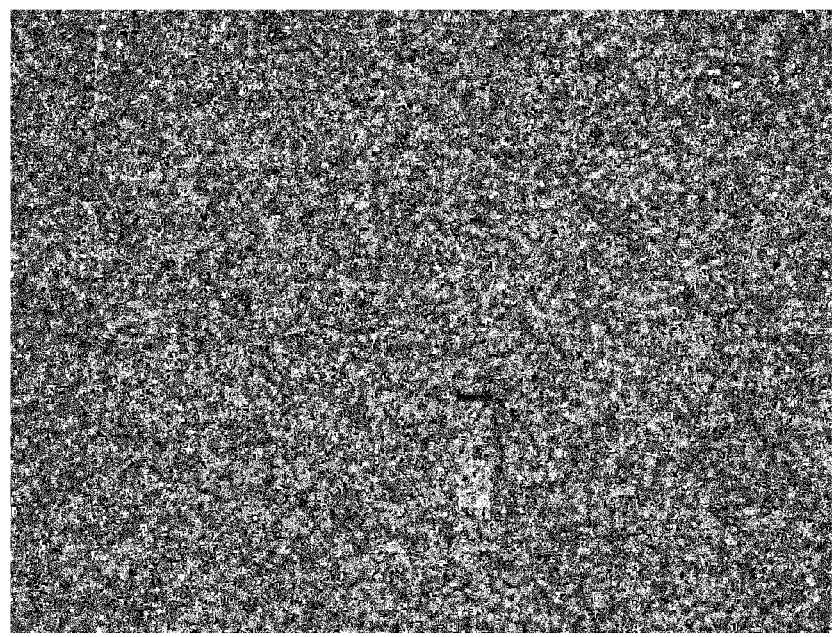
FIGS. 13 and 14 respectively illustrate a random-speckle image and a structured fringe image formed by acquiring reflected random-speckle beam and structured fringe beam from the object surface.
Figure 14:
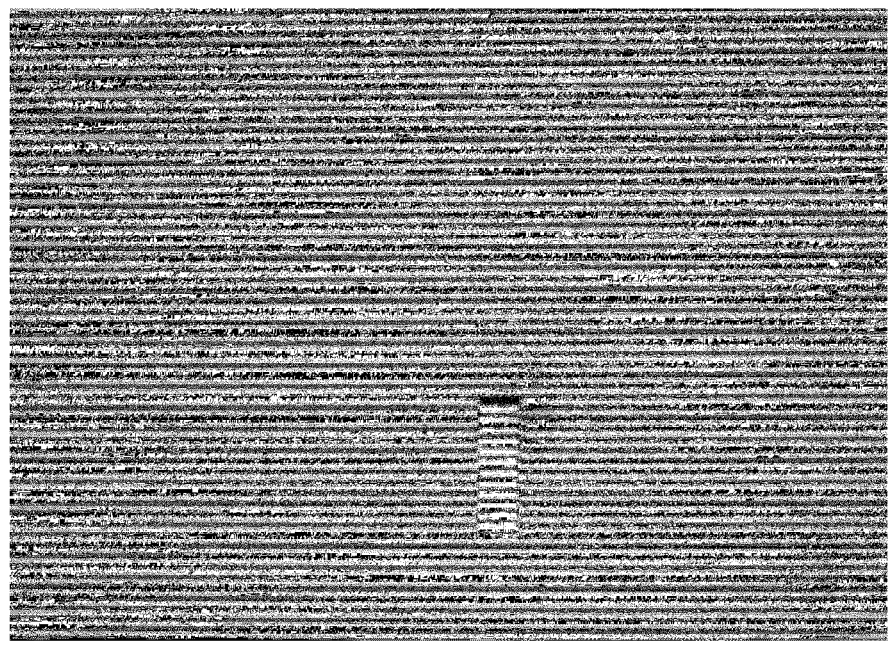
Figure 15:
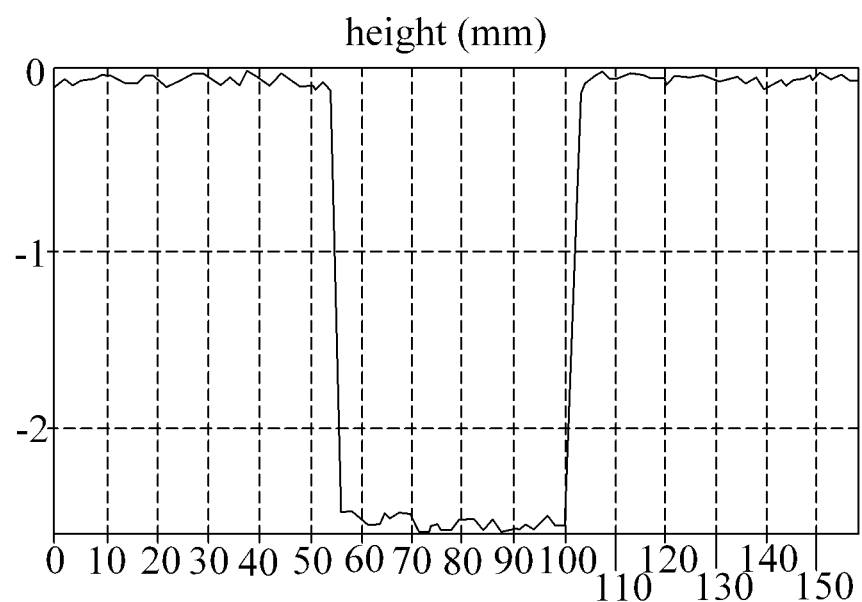
FIG. 15 illustrates a surface profile of the object by analyzing the structured fringe image.
Figure 16:
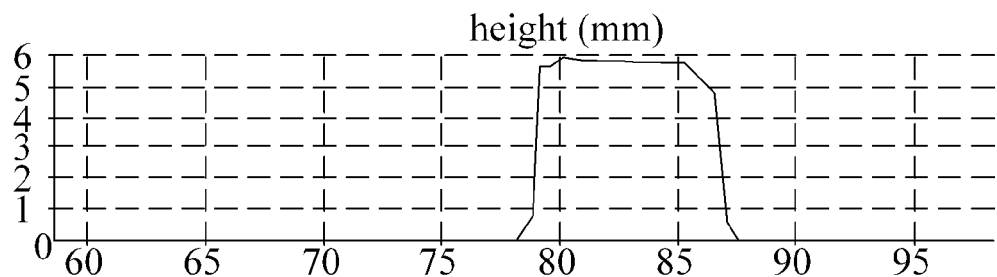
FIG. 16 illustrates a surface profile of the object by analyzing the random-speckle image.
Figure 17:
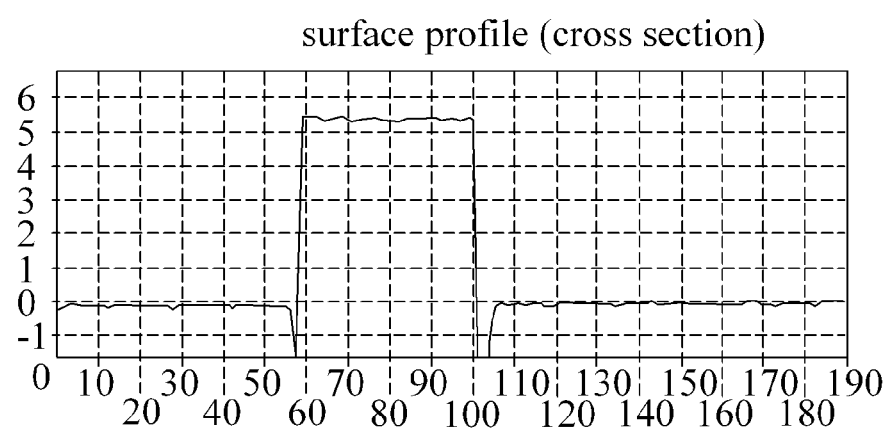
FIG. 17 illustrates a surface profile of the object by combining absolute depth determined from the random-speckle image and relative depth determined from the structured fringe image.

In the following description, an example shown the comparing result between the combination of speckle interferometry and four-step phase-shifting interferometry, and speckle interferometry or phase-shifting interferometry is described hereinafter. Please refer to FIGS. 13 and 14, in which FIG. 13 represents a random-speckle image acquired from an object having a step height of 5.5 mm, while FIG. 14 represents a structured fringe image acquired from the same object underlying test. In FIG. 15, it illustrates an analysis result by using four-step phase-shifting analysis on the acquired fringe image. It is clear that the surface depth of the inspection result is −2.6 mm at the inspecting positions, which is opposite to the real step height of the object. The error is caused due to the known $2N\pi$ ambiguities if the phase information corresponding to the step height of the object is more than the period corresponding to the width of the fringe. Meanwhile, if the surface profile is analyzed by utilizing the random-speckle image, the result is illustrated as FIG. 16, wherein the average surface depth profile is 5.8 mm that is closing to the real step height 5.5 mm of the object. Please refer to FIG. 17, which illustrates a result by combination the random-speckle image analysis and structured fringe imager analysis. From the FIG. 17, it is clear that the average surface depth of the analysis result is 5.4 mm, which is closer to the real step height of the object than the random-speckle image analysis and structured fringe image analysis. Accordingly, it is proved that by means of the combination of random-speckle image analysis and structured fringe image analysis, not only the resolution advantage of the phase-shifting analysis can be kept, but also can the measurable height limitation of step height of the object underlying test can be eliminated.

There has thus shown and described a method and apparatus for three-dimensional profilometry. Many changes, modifications, variations and other uses and application of the subject invention will become apparent to those skilled in the art after considering this specification and the accompanying drawings. All such changes, modifications, variations, uses, and applications are covered by the scope of this invention which is limited only by the appended claims.

What is claimed is:

1. A measuring apparatus for three-dimensional profilometry, comprising:
   a random-speckle generating module, generating a random-speckle beam projecting onto an object for forming a reflecting random-speckle beam;
   a structured fringe generating module, generating a structured fringe beam projecting onto the object for forming a reflecting structured fringe beam;
   an image acquiring module, detecting the reflecting random-speckle beam and the reflecting structured fringe beam for generating a random-speckle image corresponding to the reflecting random-speckle beam and a structured fringe image corresponding to the reflecting structured fringe beam; and
   a processing module, determining a surface profile on the tested object according to the random-speckle image and structured fringe image;
   wherein the random-speckle generating module further comprises a first light source for generating a first inspecting light having a first wavelength, and a first optical modulation unit for modulating the first inspecting light into the random-speckle beam, and the structured fringe generating module further comprises a second light source for generating a second inspecting light having a second wavelength, and a second optical modulation unit for modulating the second inspecting light into the structured fringe beam.

2. The apparatus of claim 1, wherein the random-speckle beam and the structured fringe beam are spatially overlapped and are synchronously projecting onto the object thereby synchronously generating the random-speckle and the structured fringe images.

3. The apparatus of claim 2, wherein the random-speckle beam has a first wavelength, while the structured fringe beam has a second wavelength different from the first wavelength, and the image acquiring module further comprises:
   a dividing module, splitting the overlapped reflecting random-speckle beam and reflecting structured fringe beam into two separated light beams;
   a first and second filters, respectively arranged on an optical path of the two separated light beams, wherein the first filter allows the first wavelength corresponding to the reflecting random-speckle light beam to pass therethrough while the second filter allows the second wavelength corresponding to the reflecting structured fringe light beam to pass therethrough; and
   a pair of light sensing device, respectively detecting the reflecting random-speckle beam passing through the first filter and the reflecting structured fringe beam passing through the second filter thereby forming the deformed random-speckle and the deformed structured fringe images.

4. The apparatus of claim 1, wherein the random-speckle beam and the structured fringe beam are asynchronously projected onto the object.

5. The apparatus of claim 1, wherein the processing module determines a first depth associated with the specific position according to the random-speckle image, determines a second depth associated with the specific position according to the structured fringe image, and combining the first and second depths for obtaining the surface depth of the specific position.

6. The apparatus of claim 5, wherein the processing module determines a phase information corresponding to the surface depth of the specific position according to the random-speckle image, wherein the phase information further includes a first phase information and a second phase information, and determining a third phase information according to the structured fringe image, wherein the first phase information is utilized to determine the first depth while the third phase information is utilized to determine the second depth.

7. The apparatus of claim 6, wherein the first phase information is $2N\pi$ and N is ranged from 0 to n, wherein n is a positive integer.

8. The apparatus of claim 1, wherein the first optical modulation unit further comprises a modulating element and an optical lenses, wherein the modulating element is DMD or LCOS or other similar function devices.

9. The apparatus of claim 1, wherein the second optical modulation unit is a Michelson type modulation unit, or a combination of an optical grating unit and an optical lens set.

10. The apparatus of claim 1, wherein the random-speckle beam has a pattern randomly distributed while the structured fringe beam has a periodic fringe pattern.

11. The apparatus of claim 1, wherein the random-speckle generating module and the structured fringe generating module are, respectively, performed by digital projecting modules independently arranged from each other, or are integrated and performed by a digital projecting module.

12. The apparatus of claim 1, further comprising:
    a database, storing a plurality of pre-calibrated image sets respectively having a specific size, wherein each image sample has a unique patterns corresponding to a specific depth.

13. The apparatus of claim 12, wherein the size of each image sample is n×n, wherein n represents odd pixels.

14. A method for three-dimensional profilometry, comprising steps of:
    projecting a random-speckle beam and a structured fringe beam onto an object;
    acquiring a reflecting random-speckle beam and a reflecting structured fringe beam, respectively, for forming a random-speckle image and a structured fringe image; and
    determining a surface depth of a specific position on a surface of the object according to the random-speckle image and the structured fringe image;
    wherein the step for determining the surface depth of the specific position on the surface of the object further comprises steps of:
      analyzing a first depth associated with the specific position according to the random-speckle image;
      analyzing a second depth associated with the specific position according to the structured fringe image; and
      combining the first and second depths thereby obtaining the surface depth of the specific position;
    wherein determining the second depth further comprises steps of:
      determining a relative phase information corresponding to the specific position according to the structured fringe image; and
      converting the relative phase information into the second depth.

15. The method of claim 14, wherein the step for determining the first depth further comprises steps of:
    determining a phase information corresponding to the specific position from the random-speckle image;
    converting the phase information into a combination of a first phase information and a second phase information; and converting the first phase information into the first depth.

16. The method of claim 15, wherein the first phase information is $2N\pi$ and N is ranged from 0 to n, wherein n is a positive integer.

17. The method of claim 15, wherein determining the phase information of the specific position further comprises steps of:
- moving a filtering mask to an image position on the random-speckle image corresponding to the specific position for acquiring an image block corresponding to a filtering mask, wherein a center of the image block is corresponding to the specific position;
- comparing the image block with a plurality of image samples corresponding to the image position stored in a database, wherein each image sample has a standard depth different from each other;
- determining the image sample having standard pattern that is most close to the block image;
- taking the standard depth of the most closing image sample as a depth of the center of the block image;
- converting the depth of the center of the image block into the phase information; and
- moving the filtering mask a specific distance along a direction for acquiring another image block corresponding to another specific position on the surface of the object, and repeating the foregoing steps for determining another phase information of the another specific position.

18. The method of claim 17, wherein the specific distance is equal to at least one pixel or at least one subpixel.

* * * * *